April 22, 1958    A. GORDON, JR., ET AL    2,832,038
RELAY TEST INSTRUMENT
Filed Sept. 1, 1955
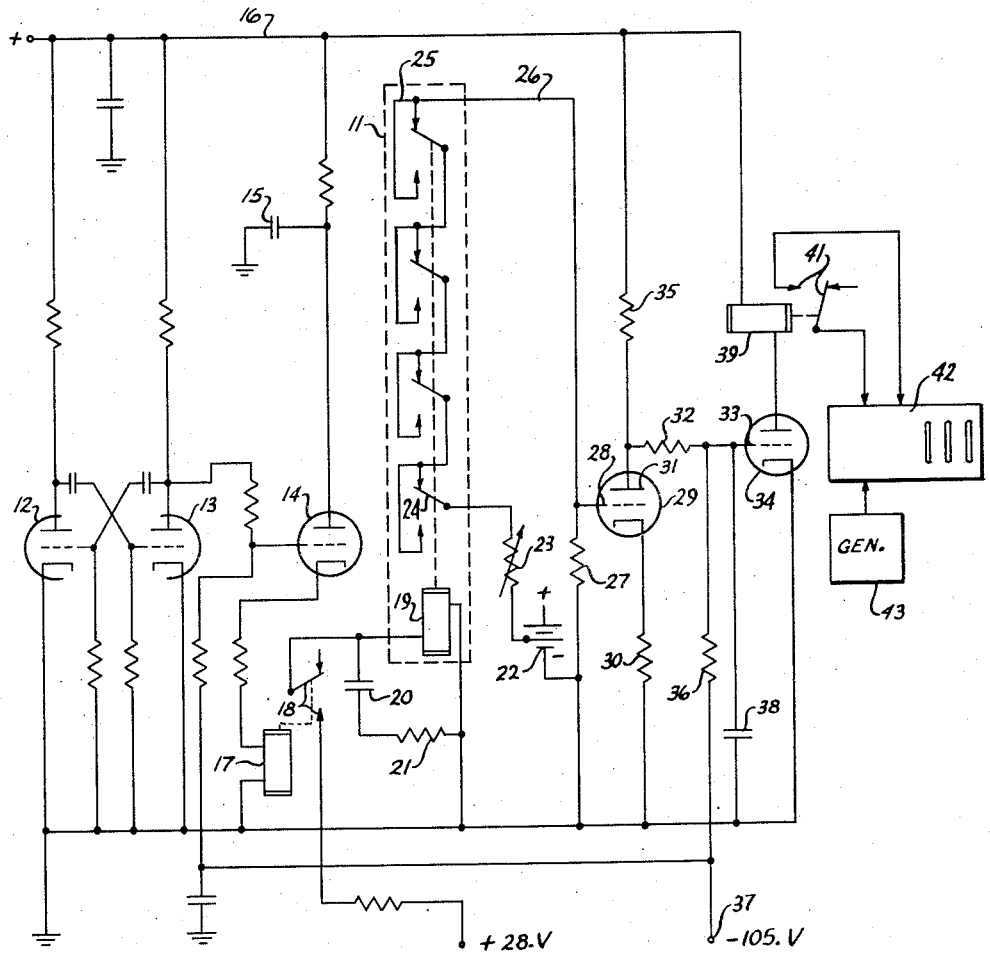
INVENTOR.
ALEXANDER GORDON, JR.
WILLIAM B. LURIE
BY
ATTORNEY

United States Patent Office 2,832,038
Patented Apr. 22, 1958

2,832,038

RELAY TEST INSTRUMENT

Alexander Gordon, Jr., Astoria, and William B. Lurie, Bronxville, N. Y., assignors to General Precision Laboratory Incorporated, a corporation of New York Application September 1, 1955, Serial No. 531,958

4 Claims. (Cl. 324—28)

This invention relates to instruments for testing electromagnetic relays, and particularly for testing relays designed for contact operation at low voltages and currents.

When relay contacts operate at very low voltages their reliability may be much less than at higher voltages, and it is therefore desirable to test such contacts at the voltages and currents which will be met in service. Unidirectional test current is desirable when the service current is to be unidirectional.

The present invention provides an adjustable source of relay contact supply imposing the same duty that the relay will have in service as regards current, voltage and time constant. The relay under test is operated periodically at a rate slow enough that the relay travel time is only a small part of one operation period such as, for example, two percent. All relay contacts are connected so that all "make" contacts are in series and all "break" contacts are in series, and a number of relays may be tested at the same time by putting their coils in parallel or series.

If the current to be used in service is unidirectional, the contact test current is unidirectional, and its direction of flow at each contact should be that which will exist in service. The relay contacts when closed, are made to apply a voltage to the control grid of an electronic tube. This voltage is amplified and the variations due to contact travel are filtered or smoothed out. The amplified output is employed to immobilize a timer. Any break in the continuity of any of the relay contacts having a time duration longer than the relay travel time causes the timer to start and to run for the duration of the break, so that at the end of any selected test period the total time indicated by the timer represents the aggregate failure time of the relay during that period. Types of failures which will operate the timer are: contact bounce, contact resistance increase above a selected value, mechanical friction or sticking, and coil failure. Whatever the cause, contact failure as indicated by the timer indication of total elapsed failure time divided by the length of time of the test gives an overall figure of relay reliability.

In place of the timer a counter may be used to count the number of separate contact failures, with a second counter, if desired, to count the total number of test operations. The quotient of the two counter readings then constitutes the figure of merit.

One purpose of this invention is to provide apparatus for testing electromagnetic relay contacts designed for low-voltage use.

Another purpose is to provide relay test apparatus which indicates the aggregate time of contact failure.

A further understanding of this invention may be secured from the detailed description and the single drawing which constitutes a schematic circuit of the invention.

Referring now to the figure, the relay 11 which is to be tested is one which is intended to be used in service on unidirectional contact current. The relay is regularly operated and released by current controlled by a multivibrator oscillator. This multivibrator employs triodes 12 and 13, and is followed by a cathode follower 14. The anode supply thereof is grounded for pulses by a capacitor 15 to prevent electrical disturbances generated by the sharp edges of the rectangular multivibrator output from reaching the power supply bus 16.

The frequency of the multivibrator is not critical, but is preferably low enough that the travel time of the relay under test is only a few percent of the time of contact closure. For example, if the travel time be 10 ms., the frequency of the multivibrator output could be made equal to one cycle per second. It is desirable that the multivibrator output be symmetrical so that the time during which the relay is operated will equal the release time. The cathode follower 14 drives a pulsing relay 17 having contacts 18 connected to energize the coil 19 of the relay 11 which is under test. A spark suppressor consisting of capacitor 20 and resistor 21 in series is connected across the relay coil 19 to protect the contacts 18 and to provide greater regularity of operation of the relay being tested.

Relay 11, when multicontact, has all contacts connected together so that any failure of a single contact interrupts the contact circuit. The contact circuit is operated on a direct-current grounded power source having precisely controlled voltage and current, so that conditions to be encountered in service may be exactly duplicated. To this end an adjustable voltage source 22 is connected in series with an adjustable resistance 23 to the contact arm 24. After passing through all front or rear contacts of the relay in series the contact power passes from the fixed contact strap 25 through conductor 26 and resistor 27 to ground. The contacts of the relay under test may be connected in series in any one of several ways, but are preferably connected so that the unidirectional test current passes through each contact in that direction in which unidirectional current will pass through the contact in service. In the example it is assumed that in service positive current will pass from each contact arm to a fixed contact, and the relay contacts are strapped so that the test current flows in this manner.

Contact conductor 26 is connected to the control grid 28 of a triode 29, so that resistor 27 has the triple function of operating as part of the contact current control resistance, as a leak grounding grid 28, and as a resistor across which potential is developed when the relay contact circuit is closed. This potential is employed as the input signal potential applied to triode 29. Triode 29 is provided with a cathode resistor 30 of such size as to bias the tube nearly to zero anode-cathode current in the absence of any input signal potential.

Output taken from anode 31 is directly coupled through resistor 32 to the control grid 33 of a triode 34. A resistor 36 applies negative potential from terminal 37 to the grid 33, voltage and resistance values being such as to secure the desired fixed grid bias. A capacitor 38 is shunted between grid 33 and ground to provide sufficient integrating effect so as to prevent appreciable change of voltage of grid 33 during relay travel time. A relay 39 is inserted in the anode circuit of tube 34, with its normally open contacts 41 connected to a timer 42. The timer 42 is connected to an alternating current generator 43, and is of the type which, when contacts 41 are closed, counts and indicates the number of cycles of the output of generator 43, stopping when contacts 41 are opened, and continuing its count when the contacts are closed again. It thus has a "least count" of one cycle of the energizing power and totalizes all periods of closure of its operating contacts 41. The frequency of generator 43 may have any value but preferably has such value that its period is a small part, say 10%, of one-half cycle of multivibrator 12/13 output. When the frequency of the multivibrator 12/13 is 1 C. P. S., the frequency of the generator 43 may be, for example 20 C. P. S. Since the smallest interval of time which can be indicated by timer 42 is then 1/20 second, a contact open period or bounce having a duration of but little more than one-tenth of the contact-closed period can operate the timer and be indicated by it.

In the operation of this test circuit, the cycle-counting timer 42 is set to zero and the multivibrator 12/13 is started and allowed to run for a desired length of time, such as five minutes. During a positive half cycle applied from the multivibrator through cathode follower 14 the pulsing relay 17 is operated, operating relay 11 and closing its front contacts. During the negative half cycle relay 11 is released and its rear contacts are closed. If all contacts of relay 11 operate perfectly, positive potential is maintained on control grid 28 continuously except for the travel time intervals of the contact arms of relay 11. The voltage on control grid 33 of relay 34 is therefore maintained at a low value. This voltage is prevented from rising appreciably during travel time by capacitor 38, which in combination with resistors 36, 32 and 35 has such time constant as to smooth out the periods of higher voltage during relay travel time, so that the anode current at no time rises to the point at which relay 39 will operate. Its contacts 41 therefore remain open and the cycle counting indicator 42 does not operate.

If, however, any contact of relay 11 remains open, when it should be closed, for a period longer than the travel time period, or if any length of open period of the contact should occur immediately before or after a travel period, thus increasing the duration of the open travel period, the relay 39 will be operated, operating the indicator 42. At the end of the chosen length of time a reading is taken of indicator 42, and indicates, in relation to the total length of test, a figure of demerit for the relay under test.

It is obvious that other types of pulsing generators may be substituted for the multivibrator, and either more or fewer amplifiers may be employed preceding and succeeding the relay under test, using either electronic tube or transistor amplification, and using any of numerous other types of amplifying stages. Smoothing to eliminate operation of the indicator by travel time interruptions may be accomplished by any type of integrating circuit or by mechanical inertial means at any point in the circuit following the relay under test.

What is claimed is:

1. A testing device for an electromagnetic relay having forward and back contacts comprising, a generator operating and releasing said relay at regular equal periods which are long relative to the relay contact travel time, a first partial circuit connecting all said relay forward contacts in series, a second partial circuit connecting all said relay back contacts in series, means for alternately connecting said first and second partial circuits in a complete circuit, adjustable unidirectional means in said complete circuit for electrically energizing said contacts, means responsive only to any opening of said contacts of longer duration than the travel time thereof, and means operated by said last-named means for timing each duration of a contact opening longer than travel time and for totalizing said timed periods, the timing of each said opening being accurate to a small part of said operate or release period.

2. A testing device for an electromagnetic relay having forward and back contacts comprising, an alternating current generator having a symmetrical square wave output and having a half period which is long relative to the travel time of said relay contacts, means operating the coil of said relay by said generator output, a first partial circuit connecting all said relay forward contacts in series, a second partial circuit connecting all said relay back contacts in series, means including said relay coil for alternately connecting said forward series and said back series contact circuit in a complete circuit, an adjustable source of direct current, a resistor connected in series with said source and said forward and back series contact circuits whereby a potential drop is produced therein when all of said front contacts are closed or when all of said back contacts are closed, a totalizing indicating timer having a starting circuit, and means responsive to said potential drop for maintaining said starting circuit open, said responsive means being unresponsive to cessations of said potential drop having durations no greater than the travel time of said relay contacts.

3. A testing device for an electromagnetic relay having forward and back contacts comprising, an alternating current generator having a symmetrical square wave output and having a half period which is long relative to the travel time of said relay contacts, a pulsing relay operated by said output, means connecting the contacts of said pulsing relay to the coil of said electromagnetic relay and to an electrical source, circuits connecting all said electromagnetic relay forward contacts in series and all back contacts in series, said forward series of contacts and said back series of contacts being alternately energized by operation of said electromagnetic relay, an adjustable source of direct potential, an adjustable resistor in series with said adjustable source, a fixed resistor in series with said adjustable resistor said adjustable source and either of said two series of contacts to form a closed circuit, one end of said fixed resistor being grounded, a discharge tube having at least an anode, cathode and control grid, said control grid being connected to the other end of said fixed resistor, a totalizing indicating timer having a starting circuit, an alternating current source connected to operate said timer, said alternating current source having a frequency at least several times higher than the output frequency of said alternating current generator, and means responsive to increases of potential of said anode for closing said starting circuit and starting said timer when the increases of potential have a time duration longer than the contact travel time of said electromagnetic relay.

4. An electromagnetic relay contact testing device in accordance with claim 3 in which said means responsive to increase of potential includes an electromagnetic starting relay having said starting circuit connected to normally open contacts thereof.

References Cited in the file of this patent
UNITED STATES PATENTS

| | | |
|---|---|---|
| 2,478,946 | Rose | Aug. 16, 1949 |
| 2,575,087 | Baker | Nov. 13, 1951 |
| 2,749,514 | Zaffarano | June 5, 1956 |